Patented Feb. 16, 1932

1,845,030

UNITED STATES PATENT OFFICE

DWIGHT R. MEANS, OF MEDINA COUNTY, OHIO, ASSIGNOR TO PITTSBURGH PLATE GLASS COMPANY, A CORPORATION OF PENNSYLVANIA

PROCESS FOR THE PRODUCTION OF AMMONIA AND CALCIUM CHLORIDE FROM AMMONIACAL LIQUORS

No Drawing.   Application filed September 20, 1926.   Serial No. 136,540.

The invention relates to a process of distilling ammonia from solutions where lime is necessary to free the ammonia, an example being the distillation of ammonia in the ammonia soda process. Here the liquor contains large amounts of ammonium carbonate and ammonium chloride. The carbonate is broken up by the application of heat and the $CO_2$ driven off, after which milk of lime is added to decompose the ammonium chloride, and the ammonia is distilled off with steam. The milk of lime carries a large amount of water, usually 70 to 80 per cent, which must be heated either before or after entering the distilling apparatus. One object among others, of the present invention is the saving of the heat required for heating the water in the milk of lime.

In carrying out this process, dry hydrated lime is added directly to the liquor carrying the ammonia in place of the milk of lime heretofore used. The lime is hydrated in substantially the same way in which commercial hydrate is prepared, and the product is screened, in this way removing any impurities and unburned stone which exist in pieces large enough to give trouble by plugging up the distilling apparatus. The screen will need to be about twenty mesh per inch, this being governed by the particular design of the distilling apparatus, as some designs will handle coarser material than others. Material failing to pass through the screen may be treated in the same manner as the material separated from the milk of lime in the practice of that process.

The care exercised in making the lime hydrate need not be as great as ordinarily practiced in the making of commercial hydrate, as the purpose of the hydration is merely to separate unburned stone and coarse impurities, and it is not necessary that all of the quick lime should be changed into the hydrate. In fact, it is an advantage to have as much quick lime present as possible, as the heat generated by its slacking in the distilling apparatus is just so much gained. It is, therefore, necessary in slacking the lime to add only so much water and is required to break the lime down into fine powder for the separation of impurities.

By using one of the so-called pumping systems now available on the market for handling finely divided solids, the dry screened hydrate can be fed into the ammonia distilling apparatus in much the same manner as milk of lime is now handled. Ammonia distilling apparatus is usually of the continuous type requiring close regulation of the incoming material, and this is promoted in such type of apparatus by first feeding the hydrate into a separate vessel, where it is mixed with some of the ammonium liquor to be distilled, then adding this liquor containing an excess of the hydrate to the distilling apparatus containing another portion of the ammoniacal liquor and distilling therefrom the ammonia. Since considerable ammonia is liberated in the mixing tank, it is necessary to provide a vent for carrying this ammonia into the distilling system. Any suitable means may be employed for getting the hydrate into the distilling apparatus.

It is quite desirable that an excess of calcium hydrate be supplied to the liquor present in the distilling apparatus so as to be reasonably sure that all of the ammonium compounds present in the liquor can react with the hydrate. For purposes of illustration, it may be stated that an excess varying from $\frac{1}{2}$ to 2 grams calcium oxide per liter over what is required to free the ammonia may be used. Obviously this may vary considerably.

As heretofore pointed out, the process involves a saving, in that the necessity is avoided of heating a large volume of water, such as is the case where milk of lime is employed. A further advantage incident to the process, as compared with the milk of lime process, results from the fact that the discarded liquor from the still has a higher concentration of calcium chloride. Since calcium chloride is in most cases recovered by evaporation, any increase in concentration reduces the amount of heat required for evaporation.

In the claims, the expression "dry hydrated lime" covers lime hydrated in substantially the same way in which commercial hydrate is prepared.

What I claim is:

1. The process of treating ammoniacal liquors containing ammonium compounds including ammonium chloride which consists in adding dry hydrated lime in excess to a portion of ammoniacal liquor derived from the ammonia soda process, adding said liquor to another portion of ammoniacal liquor derived from the ammonia soda process, distilling the resulting product to liberate ammonia and evaporating the residual liquor high in calcium chloride to recover the same therefrom.

2. The process of treating ammoniacal liquors containing ammonium compounds including ammonium chloride to produce therefrom ammonia and calcium chloride comprising mixing dry hydrated lime with a portion of said ammoniacal liquor in an amount such that the hydrate is in excess of what is required to decompose the ammonia compound, adding such liquor to another portion of the ammoniacal liquor containing ammonia and ammonium chloride, distilling the resulting product to liberate ammonia, and concentrating the residuum to recover calcium chloride.

In testimony whereof, I have hereunto subscribed my name this 9th day of Sept. 1926.

DWIGHT R. MEANS.